US005226086A

United States Patent [19]

Platt

[11] Patent Number: 5,226,086

[45] Date of Patent: Jul. 6, 1993

[54] METHOD, APPARATUS, SYSTEM AND INTERFACE UNIT FOR PROGRAMMING A HEARING AID

[75] Inventor: Jonathan C. Platt, Bloomington, Minn.

[73] Assignee: Minnesota Mining and Manufacturing Company, St. Paul, Minn.

[21] Appl. No.: 525,901

[22] Filed: May 18, 1990

[51] Int. Cl.[5] ...................... H04R 29/00; H04R 25/00; H04M 11/00

[52] U.S. Cl. ........................................ 381/58; 379/90; 379/102; 381/60; 381/68; 381/68.2; 381/68.4

[58] Field of Search ................ 379/90, 102, 106, 107; 381/23.1, 58, 60, 68, 68.2, 68.4

[56] References Cited

U.S. PATENT DOCUMENTS

| | | | |
|---|---|---|---|
| 3,989,904 | 11/1976 | Rohrer et al. | 179/107 |
| 4,173,971 | 11/1979 | Karz | 128/2 |
| 4,216,462 | 8/1980 | McGrath et al. | 340/150 |
| 4,268,721 | 5/1981 | Nielson et al. | 179/2 C |
| 4,356,545 | 10/1982 | West | 379/102 |
| 4,425,481 | 1/1984 | Mansgold et al. | 381/68 |
| 4,548,082 | 10/1985 | Engebretson et al. | 381/68.2 |
| 4,759,070 | 7/1988 | Voroba et al. | 381/60 |
| 4,825,869 | 5/1989 | Sasmor et al. | 128/419 PT |
| 4,830,018 | 5/1989 | Treatch | 128/677 |
| 4,837,805 | 6/1989 | Okumura | 379/90 |
| 4,947,432 | 8/1990 | T pholm | 381/68.2 |
| 4,972,487 | 11/1990 | Mangold et al. | 381/68 |
| 4,989,251 | 1/1991 | Mangold | 381/68.2 |
| 4,992,966 | 2/1991 | Widin et al. | 381/68 |
| 5,007,090 | 4/1991 | Bransky et al. | 381/60 |
| 5,083,312 | 1/1992 | Newton et al. | 381/68.4 |
| 5,144,674 | 9/1992 | Meyer et al. | 381/68 |

FOREIGN PATENT DOCUMENTS

| | | | |
|---|---|---|---|
| 9009760 | 9/1990 | PCT Int'l Appl. | 381/68 |

OTHER PUBLICATIONS

Bracale, Rugglero, "Multichannel Telephone System for Biomedical Applications", Med. & Biol. Eng. vol. 10 #5, Sep. 1972.

Widin, Mangold, "Fitting a Programmable Hearing Instruments" Hearing Instruments, vol. 39 #6, 1988.

Gentner Electronics Corporation "VRC-2000 Remote Control System", 1989.

Ascom Companies, "PHOX, Programmable Hearing Operating System", Oct. 27, 1989.

3M Company, "Master-Fit Hearing Evaluation and Recommendation (HEARI) System" Version 3.2 Sep. 1989.

*Primary Examiner*—James L. Dwyer
*Assistant Examiner*—William Cumming
*Attorney, Agent, or Firm*—Gary L. Griswold; Walter N. Kirn; William D. Bauer

[57] ABSTRACT

System and method for programming a plurality of hearing aids physically located at a plurality of remote locations, each of the plurality of hearing aids being capable of being responsive to the auditory characteristics of an individual user, being responsive to a set of auditory parameters and having a programmable memory for storing the set of auditory parameters. A first transmitting mechanism, located at each of the plurality of remote locations, transmits the auditory characteristics of those of the individual users located at one of the plurality of remote locations to a central location. A calculating mechanism, located at the central location, calculates an appropriate set of auditory parameters for each of the hearing aids based upon the auditory characteristics of each of the individual users. A second transmitting mechanism transmits the appropriate set of auditory parameters from the central location to each of the plurality of remote locations for each of the hearing aids. A storing mechanism, located at each of the plurality of remote locations, stores the appropriate auditory parameters in the programmable memory of each of the plurality of hearing aids.

10 Claims, 5 Drawing Sheets

METHOD, APPARATUS, SYSTEM AND INTERFACE UNIT FOR PROGRAMMING A HEARING AID

BACKGROUND OF THE INVENTION

The present invention generally relates to programmable hearing aids and, more particularly, to methods, techniques, apparatus, systems and devices for programming such programmable hearing aids.

Many individuals have hearing deficiencies. These hearing deficiencies can range from profound deafness to hearing losses which prevent the individuals from hearing sounds easily and which may prevent the understanding of speech. While there are many physiological reasons for hearing deficiencies, the usual correction available is to amplify and filter the auditory environment so that the individual can hear and, hopefully, understand more of the sounds, including speech, that the individual wishes to hear.

Auditory prostheses to ameliorate hearing losses in non-profoundly deaf individuals are well known in the art, commonly called hearing aids. These hearing aids typically are worn by the individual in a case that is carried by an ear piece behind the ear (typically called a "BTE" device), in a case that is physically placed at least partially in the external ear canal (typically called an "ITE" device) or in a case which can be physically placed within the external ear canal (typically called an "ITC" device). While these hearing aids may differ in physical size and differ in placement, they are common in their ability to amplify the auditory environment to enhance the hearing ability of the individual. Typically a hearing aid, in its most rudimentary form, includes a microphone for converting environmental sounds into an electrical signal, an amplifier for amplifying the electrical signal and a receiver (hearing aid parlance for a loudspeaker) for converting the amplified electrical signal back into a sound for delivery to the individual's ear.

Typically, an individual's hearing loss is not uniform over the entire frequency spectrum of hearing. An individual's hearing loss may be greater at higher frequencies than at lower frequencies, typical of noise induced high frequency hearing loss. Also, the degree of loss at the higher frequencies varies with individuals and the frequency at which the loss begins also varies. The measurement by which an individual's hearing loss, or, put conversely, the individual's hearing ability, is called an audiogram. A hearing health professional, typically an audiologist or an otolaryngologist, will measure the individual's perceptive ability for differing sound frequencies and differing sound amplitudes. The hearing health professional may then plot the resulting information in an amplitude/frequency diagram which graphically represents the individual's hearing ability, and, hence, the individual's hearing loss as compared with normal hearing individuals. The audiogram, then, is a graphical representation of the particular auditory characteristics of the individual. Of course, the particular auditory characteristics of the individual could also be represented in tabular form or other non-graphical form.

Since different individuals have differing hearing losses (and, hence, hearing abilities), hearing aids typically are made to be adjustable to compensate for the hearing deficiency of the individual user. Typically, the adjustment involves an adjustable filter, used in conjunction with the amplifier, for modifying the amplifying characteristics of the hearing aids. Some typical hearing aids are adjustable by physically turning screws or thumb-wheels to adjust potentiometers or capacitors to modify the auditory characteristics, e.g., filtering characteristics, of the hearing aid.

More recently, programmable hearing aids have become well known. A programmable hearing aid typically has a digital control section which stores an auditory parameter, or set of auditory parameters, which control a particular aspect, or aspects, of the signal processing characteristics of the hearing aid and has a signal processing section, which may be analog or digital, which operates in response to the control section to perform the actual signal processing, or amplification. In some hearing aids, the control section may have the ability to store a plurality of sets of auditory parameters which the individual or other device may select for use. An example of this type of programmable hearing aid is described in U.S. Pat. No. 4,425,481, Mansgold [sic] et al, Programmable Signal Processing Device, which is hereby incorporated by reference. Other examples of hearing aids which can be programmed are described in U.S. Pat. No. 4,548,082, Engebretson et al, Hearing Aids, Signal Supplying Apparatus, Systems for Compensating Hearing Deficiencies, and Methods.

With the advent of programmable hearing aids, apparatus was needed in order to program the aids. The programming systems and methods known in the art have generally taken a couple of forms.

In one form, the programming system and method is located remote from the individual who would like to use the hearing aid, typically at a common site of the manufacturer. This system and method, common in the industry, is for the hearing aid dispenser (the hearing health professional responsible for fitting the hearing aid to the individual) to take an audiogram of the individual and to send the audiogram, perhaps with other pertinent information, to the manufacturer of the hearing aid along with an order for the hearing aid. The manufacturer may then select the appropriate hearing aid circuit with the appropriate frequency response. Alternatively, the manufacturer may take a stock hearing aid and adjust, or otherwise "program" the hearing aid, at the factory to compensate for the individual's hearing deficiency. The manufacturer, when the selection, adjustment or programming of the hearing aid is complete, may then send the hearing aid to the dispenser. The dispenser may then deliver the programmed hearing aid to the individual. Any changes in the selection, adjustment or programming of the hearing aid, of course, must be accomplished either by sending the hearing aid back to the manufacturer or ordering a new hearing aid from the manufacturer. This process is time consuming and, typically, results in many hearing aids being returned to the manufacturer increasing the individual customer's costs and level of frustration.

In another form, the programming system and method is located at the location of the hearing health professional near the individual who would like to use the hearing aid. Typically this site is remote from the manufacturer. In the commercial embodiment of the hearing aid described in the Mansgold [sic] patent, namely the "MemoryMate TM" brand hearing aid marketed by Minnesota Mining and Manufacturing Company, St. Paul, Minn. (3M), the assignee of this application, this apparatus takes the form of a general purpose computer loaded with specific software to perform the programming function (MemoryMate is a trademark of Minnesota Mining and Manufacturing Company.). The computer is connected to the "MEMORYMATE TM" hearing aid by means of an interface unit directly hardwired to the computer and coupled by electrical cord to the "MEMORYMATE TM" hearing aid. This programming system is known commercially as the "Master-Fit TM" programming system and is available from 3M. (Master-Fit is a trademark of Minnesota Mining and Manufacturing Company.) In performing the programming function, the hearing health professional inputs the individual's audiogram into the computer, allows the computer to calculate the auditory parameters for the hearing aid which are optimal for certain listening situations for the individual in view of the hearing deficiency of the individual. The computer then directly programs the hearing aid through the directly connected interface unit.

This last system and method of programming the programmable hearing aids is quick and efficient for the individual user of the hearing aid. The dispenser can stock the programmable hearing aid in his office. When the customer arrives, the audiogram may be taken, either directly from the individual or from records from previous visits, entered into the computer and the hearing aid programmed immediately. The hearing aid may then be tried on the individual during this fitting process and readjusted, i.e., reprogrammed, immediately during this visit. The result is a system and method of programming hearing aids which minimizes the customer's waiting time and delivers a programmed hearing aid which actually works for the customer "the first time." This also results in fewer returns of hearing aids from the dispenser to the manufacturer due to incorrect selection, adjustment or programming. This last system and method of programming, however, does result in fewer sites being available to dispense the hearing aid. This is due to the large cost of the programming system (computer and associated software), the space which this system takes up in the dispenser's office and the specialized technical knowledge needed to operate the system.

SUMMARY OF THE INVENTION

The present invention provides a considerable savings in hardware costs when the programming system is utilized in situations with hearing health professionals located at different sites. With the present invention, no longer is a general purpose computer required to be present in each office of each hearing health professional. Now only a single computer system is required to be located at the central office.

The present invention further makes available a highly experienced hearing aid programming specialist with technical knowledge and continuing technical experience in selecting and adjusting the programming system to quickly utilize the full capabilities of the system to develop a appropriate set of auditory parameters, i.e., to program the hearing aid.

The present invention provides a programming system in which a programmable hearing may be programmed from a physically distant location. This results in significant savings in resources and makes programming of programmable hearing aids available to offices of hearing health professionals in the smallest of offices and in the remotest of locations. This brings the benefit of programmability of hearing aids to individuals who before could have them due to the lack of local programming capability.

In one embodiment, the present invention provides a system for programming a plurality of hearing aids, each of the plurality of hearing aids capable of being responsive to the auditory characteristics of an individual user, being responsive to a set of auditory parameters and having a programmable memory for storing the set of auditory parameters. A plurality of first transmitting mechanisms transmits the auditory characteristics of each of the individual users to an office are used. A calculating mechanism calculates, at the office, an appropriate set of auditory parameters for each of the plurality of hearing aids based upon the auditory characteristic of the individual user. A second transmitting mechanism transmits the appropriate set of auditory parameters from the office to each corresponding one of the plurality of hearing aids. A plurality of storing mechanisms store the appropriate set of auditory parameters in the programmable memory of each of the plurality of hearing aids.

In another embodiment, the present invention provides a system for programming a plurality of hearing aids physically located at a plurality of remote locations, each of the plurality of hearing aids being capable of being responsive to the auditory characteristics of an individual user, being responsive to a set of auditory parameters and having a programmable memory for storing the set of auditory parameters. A first transmitting mechanism, located at each of the plurality of remote locations, transmits the auditory characteristics of those of the individual users located at one of the plurality of remote locations to a central location. A calculating mechanism, located at the central location, calculates an appropriate set of auditory parameters for each of the hearing aids based upon the auditory characteristics of each of the individual users. A second transmitting mechanism transmits the appropriate set of auditory parameters from the central location to each of the plurality of remote locations for each of the hearing aids. A storing mechanism, located at each of the plurality of remote locations, stores the appropriate auditory parameters in the programmable memory of each of the plurality of hearing aids.

In another embodiment, the present invention provides an apparatus for programming a hearing aid to accommodate the auditory characteristics of a user, the hearing aid being responsive to a set of auditory parameters and having a programmable memory for storing the auditory parameters. A determining mechanism determines the auditory characteristics of the user. A first transmitting mechanism transmits the auditory characteristics of the user via a telephonic link to a remotely located central location. A calculating mechanism calculates, at the central location, an appropriate set of auditory parameters for the hearing aid based upon the auditory characteristics of the user. A second transmitting mechanism transmits the appropriate set of auditory parameters from the central location via the telephonic link to the hearing aid. A storing mechanism stores the appropriate set of auditory parameters in the programmable memory.

In another embodiment, the present invention provides a method of programming a hearing aid in order to accommodate the auditory characteristics of an individual user, the hearing aid being responsive to a set of auditory parameters and having a programmable memory for storing the auditory parameters. The method transmits the auditory characteristics of the individual user via a communications media to a central location. The method then calculates, at the central location, an appropriate set of auditory parameters for the hearing aid based upon the auditory characteristics of the individual user. The method then transmits the appropriate set of auditory parameters from the central location via the communication media to the hearing aid. The method then stores the appropriate set of auditory parameters in the programmable memory.

In another embodiment, the present invention provides a method of programming a plurality of hearing aids physically located at a plurality of remote locations, each of the plurality of hearing aids being capable of being responsive to the auditory characteristics of an individual user, being responsive to a set of auditory parameters and having a programmable memory for storing the set of auditory parameters. The method first transmits from each of the plurality of remote locations the auditory characteristics of those of the individual users located at each of the plurality of remote locations to a central location. The method then calculates at the central location an appropriate set of auditory parameters for each of the hearing aids based upon the auditory characteristics of each of the individual users. The method then transmits the appropriate set of auditory parameters from the central location to each of the plurality of remote locations for each of the hearing aids. The method then stores the appropriate set of auditory parameters in the programmable memory of each of the plurality of hearing aids.

In another embodiment, the present invention provides an interface unit adapted to be utilized with a programmable hearing aid to accommodate the auditory characteristics of an individual user and a telephonic link to a remotely located central programming device, the hearing aid being responsive to a set of auditory parameters and having a programmable memory for storing the set of auditory parameters. Optionally, a transmitting mechanism transmits the auditory characteristics of the individual user to the central programming device via the telephonic link. A receiving mechanism receives an appropriate set of auditory parameters via the telephonic link which have been calculated by the central programming device. A storing mechanism stores the appropriate set of auditory parameters in the programmable memory of the hearing aid.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

Figure 1:
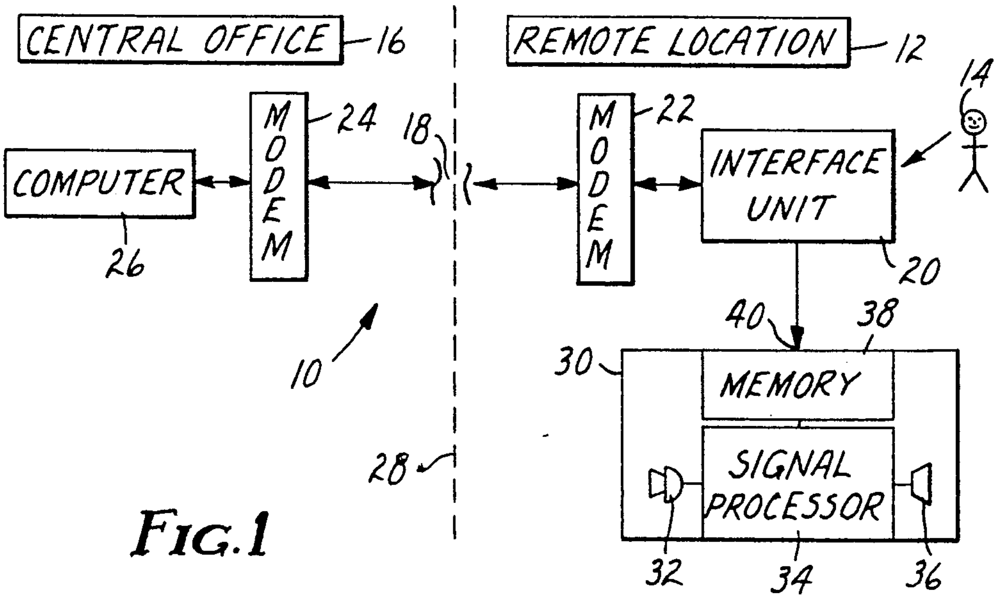
FIG. 1 is a block diagram representation of an embodiment of the present invention.

An individual's hearing loss is not usually uniform over the entire frequency spectrum of hearing. The hearing loss may be greater at higher frequencies than at lower frequencies, which is typical of noise induced high frequency hearing loss. Also, the degree of loss at the higher frequencies varies with individuals and the frequency at which the loss begins also varies. The measurement by which an individual's hearing loss, or, put conversely, the individual's hearing ability, can be illustrated is called an audiogram. A hearing health professional, typically an audiologist or an otolaryngologist, will measure the individual's perceptive ability for differing sound frequencies and differing sound amplitudes. The hearing health professional may then plot the resulting information in an amplitude/frequency diagram which graphically represents the individual's hearing ability, and, hence, the individual's hearing loss as compared with normal hearing individuals. The audiogram, then, is a graphical representation of the particular auditory characteristic of the individual. Of course, the particular auditory characteristic of the individual could also be represented in tabular form or other non-graphical form.

A hearing aid in its most rudimentary form consists of a microphone for converting environmental sounds into an electrical signal, an amplifier for amplifying the electrical signal and a receiver (hearing aid parlance for a loudspeaker) for converting the amplified electrical signal back into a sound for delivery to the individual's ear canal.

Since different individuals have differing hearing losses (and, hence, hearing abilities), hearing aids typically are made to be adjustable to compensate for the hearing deficiency of the individual user. Typically, the adjustment involves an adjustable filter, used in conjunction with the amplifier, for modifying the amplifying characteristics of the hearing aids. Some typical hearing aids are adjustable by physically turning screws or thumb-wheels to adjust potentiometers or capacitors to modify the auditory characteristics, e.g., filtering characteristics, of the hearing aid.

More recently, programmable hearing aids have become well known. A programmable hearing aid typically has a digital control section and a signal processing section.

The digital control section stores an auditory parameter, or set of auditory parameters, which control a particular aspect, or aspects, of the amplifying characteristics or other characteristics of the hearing aid.

The signal processing section, which may be analog or digital, operates in response to the control section to perform the actual signal processing, or amplification.

In some hearing aids, the control section may have the ability to store a plurality of sets of auditory parameters which the individual or other device may select for use. An example of this type of programmable hearing aid is described in U.S. Pat. No. 4,425,481, Mansgold [sic] et al, Programmable Signal Processing Device, which is hereby incorporated by reference.

Other examples of hearing aids which can be programmed are described in U.S. Patent No. 4,548,082, Engebretson et al, Hearing Aids, Signal Supplying Apparatus, Systems for Compensating Hearing Deficiencies, and Methods.

With the advent of programmable hearing aids, apparatus is needed in order to program the aids. The programming systems and methods known in the art have generally taken a couple of forms.

In one form, the programming system and method is located remote from the individual who would like to use the hearing aid, typically at a common site of the manufacturer. This system and method, common in the industry, is for the hearing aid dispenser (the hearing health professional responsible for fitting the hearing aid to the individual) to take an audiogram of the individual and to mail a copy of the audiogram, perhaps with other pertinent information, to the manufacturer of the hearing aid along with an order for the hearing aid. The manufacturer may then select the appropriate hearing aid circuitry with the appropriate frequency response. Alternatively, the manufacturer may take a stock hearing aid and adjust, or otherwise "program" the hearing aid, at the factory to better allow for the hearing aid to compensate for the individual's hearing deficiency. The manufacturer, when the selection, adjustment or programming of the hearing aid is complete, may then mail the hearing aid to the dispenser. The dispenser may then deliver the programmed hearing aid to the individual. Any changes in the selection, adjustment or programming of the hearing aid, of course, must be accomplished either by mailing the hearing aid back to the manufacturer or ordering a new hearing aid from the manufacturer. This process is time consuming and, typically, results in many hearing aids being returned to the manufacturer and results in an increased level of frustration on the part of the individual customer as well as increasing the individual customer's costs.

In another form, the programming system and method is located at the location of the hearing health professional, typically near the individual who would like to use the hearing aid. Typically this site is remote from the hearing aid manufacturer. In the commercial embodiment of the hearing aid described in the Mansgold [sic] patent, namely the 3M "MemoryMate TM" brand hearing aid marketed by Minnesota Mining and Manufacturing Company, St. Paul, Minn. ("3M"), the assignee of this application, this apparatus takes the form of a general purpose computer specially programmed to perform the programming function. The computer is connected to the "MemoryMate TM" hearing aid by means of an interface unit directly hard-wired to the computer and coupled by electrical cord to the MemoryMate hearing aid. This programming system is known commercially as the "Master-Fit TM" programming system and is available from 3M. In performing the programming function, the hearing health professional enters the individual's audiogram into the computer, allows the computer to calculate the auditory parameters for the hearing aid which are optimal for certain listening situations for the individual in view of the hearing deficiency of the individual. The computer then directly programs the hearing aid through the directly connected interface unit.

When a general purpose computer is utilized to program a programmable hearing aid, some sort of interface unit is required to connect the programmable hearing aid to the general purpose computer. A general purpose computer such as the PS/2 TM computer manufactured by International Business Machines ("IBM") is used with the "Master-Fit TM" fitting system described above. The interface unit is connected between one of the ports of the IBM computer, either serial or parallel but preferably the RS232 serial port, and to the programming terminal of the "MemoryMate TM" hearing aid. This interface unit converts the programming signals sent by the computer in RS232 serial format (or other general computer input/output format) into the specific commands and signals necessary to program the particular hearing aid. This interface is directly connected by cable to the general purpose computer and to the programmable hearing aid.

An example of an interface unit which can be used with the "Master-Fit TM" fitting system and MemoryMate TM hearing aid described above is illustrated and described in Operators Manual 8140 "Master-Fit TM" Hearing Evaluation and Recommendation (HEAR) System, 3M Part No. 70-2005-5850-3. This exemplary interface unit may be obtained from Minnesota Mining and Manufacturing Company, St. Paul, Minn.

The system for programming and method of the present invention provides a mechanism whereby a location remote from the location of the hearing health professional who will actually program the hearing aid, typically a central office, can be used to program hearing aids. In a preferred embodiment hearing aids in a plurality of locations can be programmed from a single central office.

A computer or other programming equipment can be located at a central office. Typically this site may be the hearing aid manufacturer's headquarters or regional operations site. Of course, a central office completely separate from other operations could be established and operate as the central office. The term "central office", for purposes of the present invention, simply means a location or office which not the same as the location or office of the hearing health professional who is fitting the hearing aid to the individual. The "central office" does not have to be geographically central to the locations or offices of the various hearing aid professionals or, indeed, central in any geographic sense. The office is central only in that it can perform programming for more than one remote location.

For purposes of the following discussion the term "remote location" refers to the location of the hearing health professional who is fitting the programmable hearing aid to the individual's auditory characteristics. Typically this location is an audiologist's office or the office of a hearing aid dispenser. The location of the hearing health professional's office and, hence, the physical location of the "remote location" may be just about anywhere. The only requirement is that the remote location have access to a communications medium such as a telephone. The hearing health professional's office does not have to be geographically remote from the central office or, indeed, remote in any geographic sense. The location is remote only in terms of the function of programming the hearing aid.

Where the programming system is utilized in situations with hearing health professionals located at different sites, a considerable savings in hardware costs can be achieved using the present invention. With the present invention, no longer is a general purpose computer required to be present in each office of each hearing health professional. Now only a single computer system is required to be located at the central office. An interface unit specifically adapted to communicate between the hearing aid to be programmed and a communications medium capable of transmitting information over long distances is required to be present in the hearing health professional's office, in addition to the hearing aid to be programmed, of course.

Having reference to the programming system 10 illustrated in FIG. 1, a hearing health professional, located in a remote location 12, takes an audiogram of an individual's 14 hearing loss, or capability, in a conventional manner. The hearing health professional then transmits the information in the audiogram, and perhaps other pertinent information such as patient information or billing information, to the central office 16 via a commonly used and otherwise available communications medium 18. The communication of the audiogram information can occur either through the interface unit 20 at the remote location 12 in the professional's office or separately through the same communications medium 18 or through a separate communications medium. If accomplished through the interface unit 20, the interface unit 20 receives the audiogram information of the individual 14. The interface unit 20 then transmits the information through modem 22 across communications medium 18, through another modem 24 located in the central office 16 to the computer 26. The interface unit 20 is similar to interface units previously used to program programmable hearing aids but has special characteristics. Modems 22 and 24 are conventional. Communications medium 18 preferably is the conventional telephone system. Computer 26 is, preferably, the same general purpose computer which has been previously used in the Master-Fit TM fitting system. Dashed line 28 represents the physical spacing of the remote location 12 from the central office 16. Communication of the audiogram information may occur as a result of the central office originating telephone contact.

The central office 16 then has the information necessary to create the data needed to program the programmable hearing aid 30. The information needed by the computer 26 is exactly the same information needed by the general purpose computer of the Master-Fit TM fitting system. The computer 26 then calculates an appropriate set of auditory parameters with which to program the hearing aid 30. This calculation is done in conventional manner.

The computer 26 in the central office 16 then transmits the set of auditory characteristics back to the remote location 12 via modem 24, communication medium 18 and modem 22. Communication medium 18 may be the same medium with which the central office 16 received the audiogram information or may be a completely separate medium. Preferably the medium 18 is the conventional telephone system. This transmission of the auditory characteristics may occur on the same telephone connection with which the central office 16 received the audiogram information or may be a separate connection. The separate connection can occur at either the same time, i.e., simultaneously or near-simultaneously, or at a later time. If it is desired to be at a later time, it is possible that multiple requests from auditory characteristics from a particular remote location 12 could be batched and transmitted at one time. Again modems 24 and 22 are conventional.

Interface unit 20 receives the set of auditory parameters from modem 22 and converts the auditory parameters, if necessary, into a format utilizable by the programmable hearing aid 30.

Programmable hearing aid 30 is conventional and, preferably, is the "MemoryMate TM" hearing aid as described in the Mansgold [sic] patent referenced above. The programmable hearing aid 30 has a microphone 32 which is coupled to a signal processor 34 which in turn is coupled to a receiver (loudspeaker) 36. Microphone 32, signal processor 34 and receiver 36 represent the audio path of the hearing aid 30 and may be either analog, preferred, or digital. The signal processor 34 is responsive to auditory parameters stored in a memory 38 of the hearing aid 30.

Interface unit 20 is coupled to hearing aid 30 through a programming port 40. The auditory characteristics received by interface unit 20 are then stored into memory 38 of the hearing aid 30 to complete the programming process.

Figure 2:
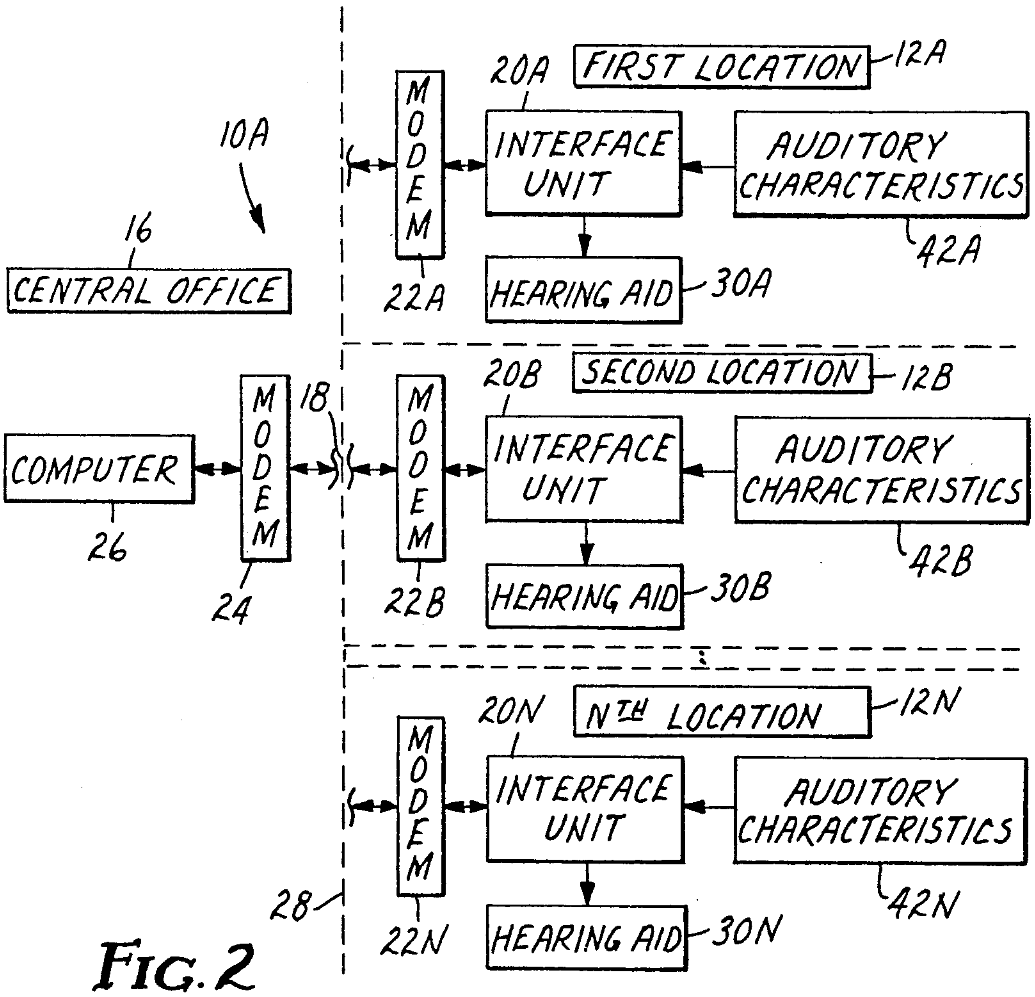
FIG. 2 is a block diagram representation of another embodiment of the present invention.

In the programming system 10A illustrated in FIG. 2, a plurality of remote locations are illustrated, designated first location 12A, second location 12B and Nth location 12N. A hearing health professional, located in a each of the remote locations 12A, 12B and 12N, may take an audiogram of separate individual's hearing loss, or capability, in a conventional manner. The hearing health professionals may then transmit the auditory characteristics (42A, 42B and 42N) of each individual, usually information found in the audiogram, and perhaps other pertinent information such as patient information or billing information, to the central office 16 via a commonly used and otherwise available communications medium 18. The communication of the audiogram information can occur either through the interface unit (20A, 20B or 20B, respectively) at the remote location (12A, 12B or 12N, respectively) in the professional's office or separately through the same communications medium 18 or through a separate communications medium. If accomplished through the interface unit (20A, 20B or 20N), the interface unit (20A, 20B or 20N) receives the auditory characteristics information of the respective individual. The interface unit (20A, 20B or 20N) then transmits the auditory characteristics through modem (22A, 22B or 22N) across communications medium 18, through another modem 24 located in the central office 16 to the computer 26. Each interface unit 20A, 20B or 20N is identical to the interface 20 illustrated in FIG. 1. Modems 22A, 22B, 22N and 24 are conventional. Communications medium 18 preferably is the conventional telephone system. Computer 26 again is, preferably, the same general purpose computer which has been previously used in the "Master-Fit TM" fitting system. Dashed line 28 represents the physical spacing of the remote locations 12A, 12B and 12N from central office 16.

Thus, programmable hearing aids (30A, 30B, 30N) from a plurality of locations can be programmed remotely with the use of a single computer 26. This results in significant savings in resources and makes programming of programmable hearing aids available to offices of hearing health professionals in the smallest of offices and in the remotest of locations. This brings the benefit of programmability of hearing aids to individuals who before could have them due to the lack of local programming capability.

Further, the centralized programming function allows for a highly experienced hearing aid programming specialist with extensive technical knowledge and continuing experience in selecting auditory parameters for use in highly technical programmable hearing aids.

The hearing health professional in first location 12A may "call" the central office 16 at the same time as the hearing health professionals in the second location 12B or Nth location 12N. This can be accomplished, for example, by the use of multiple modems 24 or through the use of multiple ports on computer 26 using multiplexing techniques well known in the art. Alternatively, of course, the hearing health professionals in different locations can place their "calls" to the central office at different times.

The central office 16 has the auditory characteristics of the individual necessary to create the data needed to program the programmable hearing aids 30A, 30B and 30N. The information needed by the computer 26 is exactly the same information needed by the general purpose computer of the "Master-Fit TM" fitting system. The computer 26 then calculates an appropriate set of auditory parameters with which to program each individual hearing aid 30A, 30B and 30N. These calculations are done in conventional manner.

The computer 26 in the central office 16 then transmits the sets of auditory characteristics back to the remote locations 12A, 12B and 12N via modem 24, communication medium 18 and modems 22A, 22B and 22N, respectively. Communication medium 18 may be the same medium with which the central office 16 received the auditory characteristics or may be a completely separate medium. Preferably the medium 18 is the conventional telephone system. This transmission of the auditory characteristics may occur on the same telephone connection with which the central office 16 received the auditory characteristics or may be a separate connection. The separate connection can occur at either the same time, i.e., simultaneously or near-simultaneously, or at a later time. If it is desired to be at a later time, it is possible that multiple requests for auditory parameters from remote locations 12A, 12B and 12N could be batched and transmitted at a later time. Again modems 24, 22A, 22B and 22N are conventional.

Interface units (20A, 20B and 20N, respectively) individually receive the set of auditory parameters from modems 22A, 22B and 22N, respectively, and convert the auditory parameters, if necessary, into a format utilizable by the programmable hearing aids 30A, 30B and 30N, respectively.

Again, the programmable hearing aids 30A, 30B and 30N are conventional and, preferably, are the MemoryMate TM hearing aid as described in the Mansgold [sic] patent referenced above.

In general, the particular form of communication medium 18 utilized is not important, except that it is envisioned that communication medium 18 be capable of transmitting electronic information over a considerable physical distance. In particular, it is required that communication medium 18 be capable of transmitting electronic information reliably between the central office 16 and the remote locations 12A, 12B and 12N. The preferred communication medium 18 is the conventional telephone system. It is widely available and reliable. Other examples of communication medium 18 which could be used include satellite data transmission, microwave and wide area networks (LANs).

Figure 3:
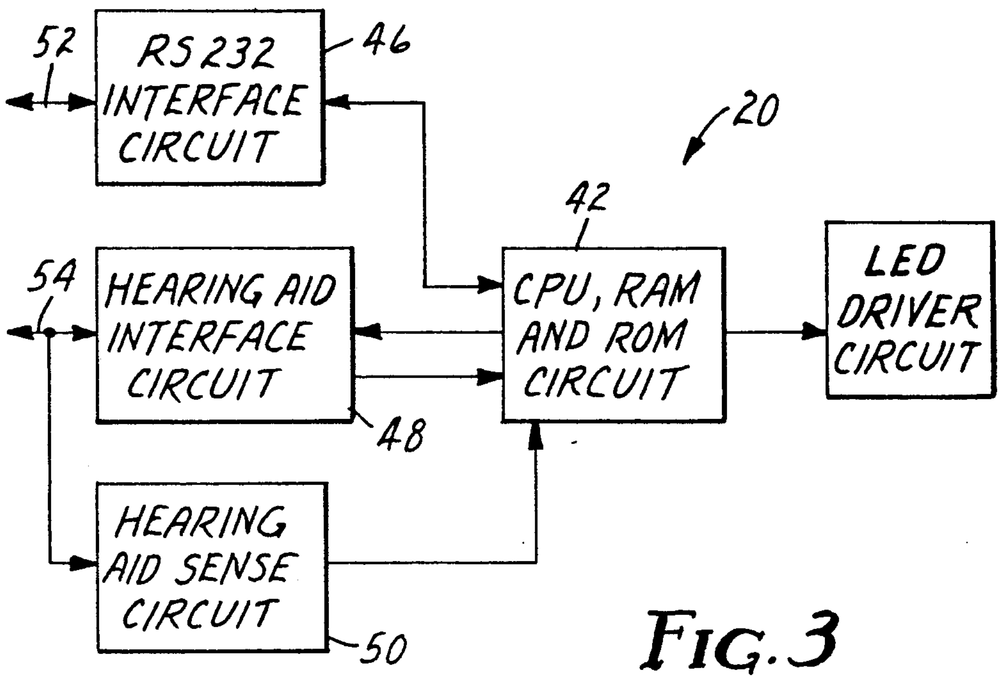
FIG. 3 is a block diagram of the interface unit of the present invention.

A block diagram of the interface unit 20 is illustrated in FIG. 3. Interface unit 20 accomplishes the "interface" between modem 22 and a programmable hearing aid 30. Interface unit 20 receives commands sent from the central office 16 by way of communication medium 18. Interface unit 20 may read, i.e., retrieve the set of auditory parameters already stored in the memory 38 of the hearing aid 30, or may program the hearing aid 30 by storing a new set of auditory parameters in the memory 38 of the hearing aid 30. Auditory parameters read by interface unit 20 may be relayed by way of modem 22 and communication medium 18 to computer 26 located in central office 16.

Interface unit 20 is constructed of five separate functional groups, namely CPU, RAM and ROM circuit 42, LED driver circuit 44, RS232 interface circuit 46, hearing interface circuit 48 and hearing aid sense circuit 50.

Interface unit 20 is coupled to modem 22 through RS232 interface circuit 46 by way of modem port 52. RS232 interface circuit also converts the 0 to 5 volt signal levels used internally to the RS232 standard levels. RS232 interface circuit is a standard serial interface circuit which is available from a number of vendors. Interface 20 is coupled to programmable hearing aid 30 through hearing aid interface circuit 48 by way of hearing aid port 54. Hearing aid interface circuit 48 provides capability of both reading and writing data from/to the memory 38 of hearing aid 30. Hearing aid sense circuit 50 performs a sensing operation to determine when a hearing aid 30 is connected to hearing aid port 54. CPU, RAM and ROM circuit 42 contains a microcontroller and controls the transfer of data to and from the RS232 interface circuit 46 and the hearing aid interface circuit 48. LED Driver circuit 44, preferably, has as status indicators six bi-directional red/green light emitting diodes.

Figure 4A:
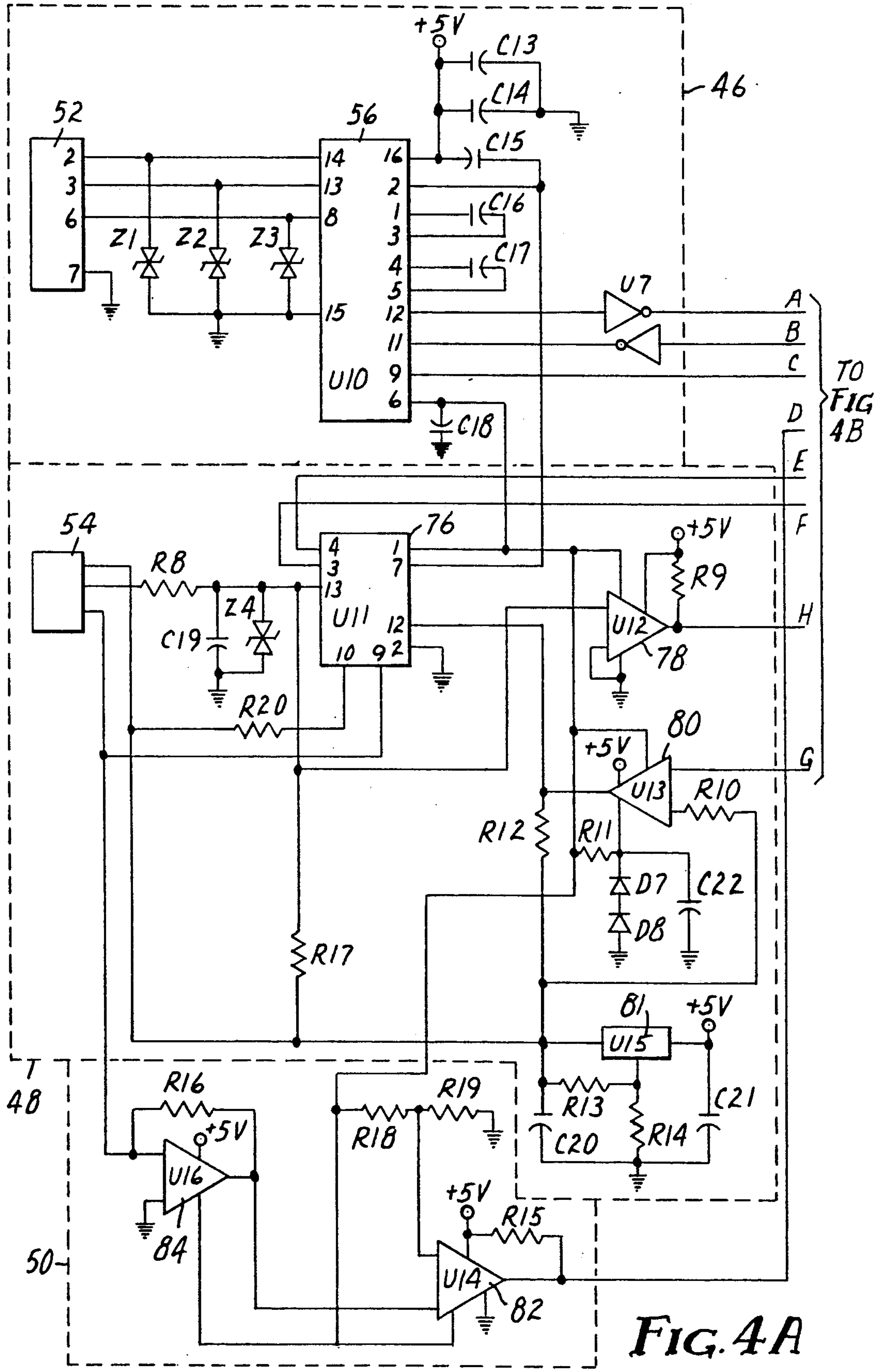
FIGS. 4A, 4B and 4C are a schematic diagram of the interface unit of the present invention.
Figure 4B:
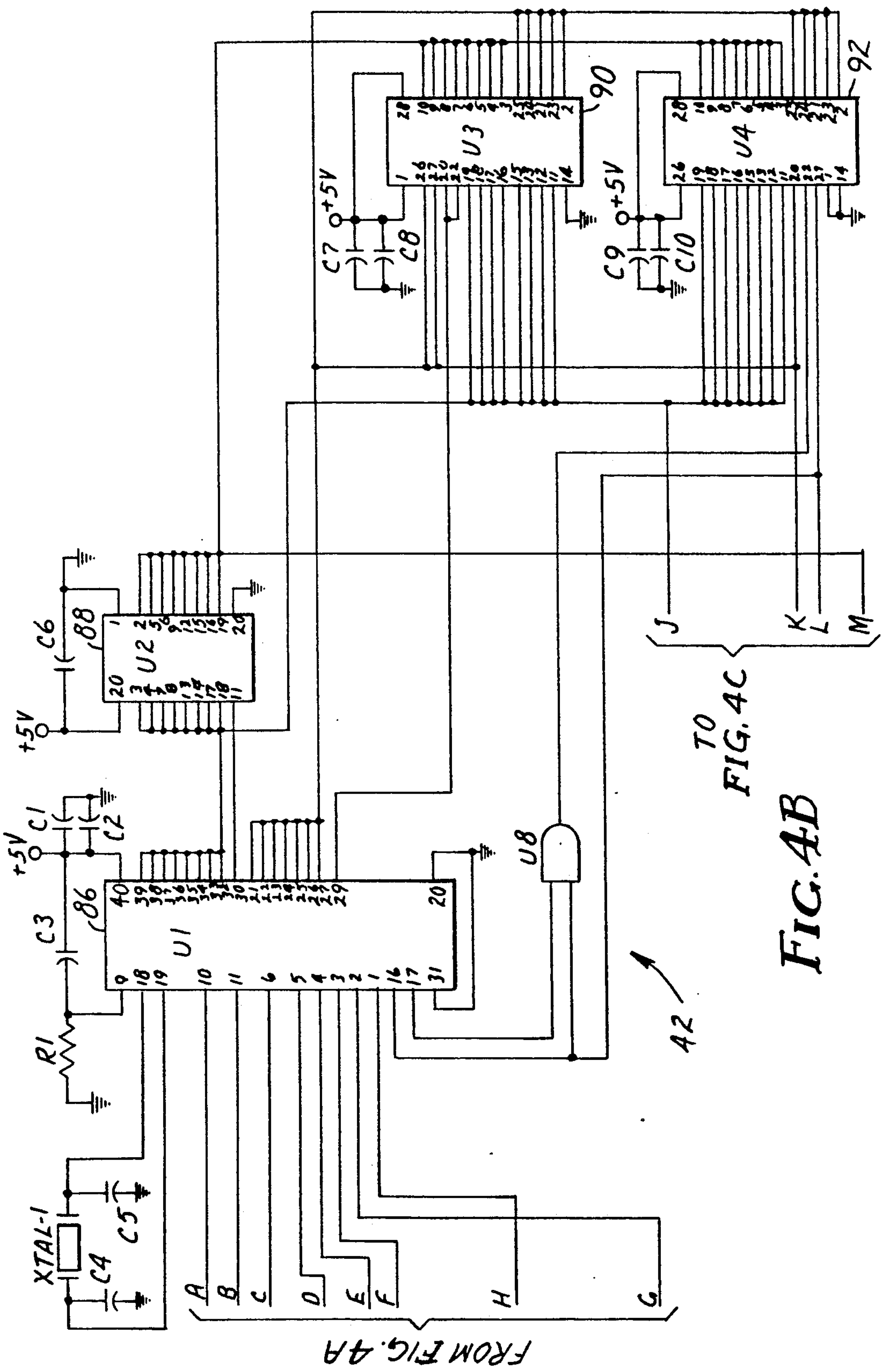
Figure 4C:
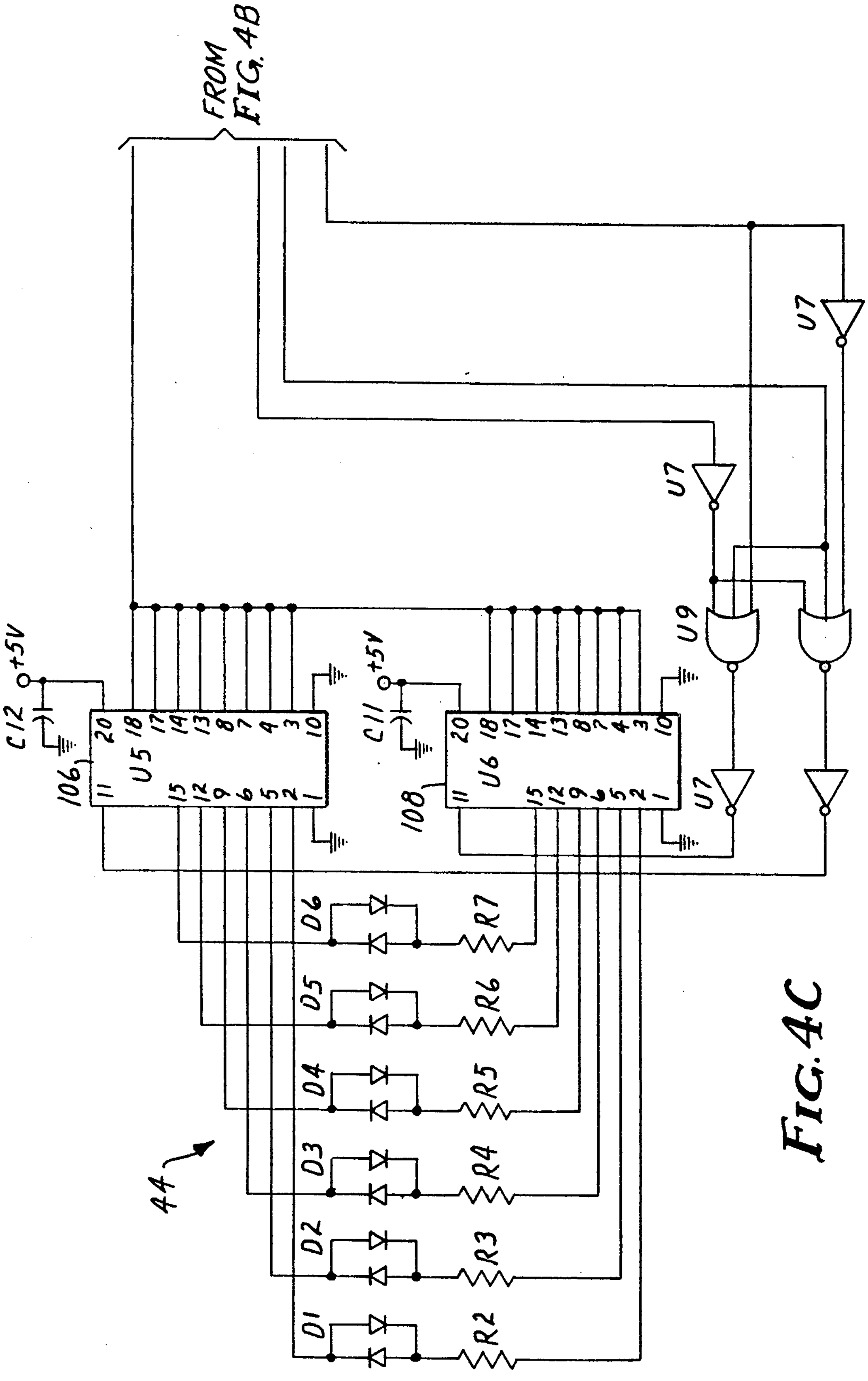

FIG. 4 represents a detailed schematic diagram of interface unit 20. Interface unit 20 is constructed of the same five separate functional groups discussed with respect to FIG. 3, namely CPU, RAM and ROM circuit 42, LED driver circuit 44, RS232 interface circuit 46, hearing interface circuit 48 and hearing aid sense circuit 50.

RS232 interface circuit 46 communicates with modem 22 through modem port 52 with the use of standard interface protocol known as RS232. Interface device 56 converts the 0 to 5 volt signal levels used by the CPU, RAM and ROM circuit 42 to the standard RS232 voltage levels. Interface device 56 also generates a minus 10 volts that is used for both the RS232 voltage levels but also by the hearing aid interface circuit 54. Actual "bit framing" is performed by the CPU, RAM and ROM circuit 42.

Hearing aid interface circuit 48 provides the data interchange with the memory 38 of hearing aid 30. Analog switch 76 switches the data interface lines on hearing aid port 54 between receive and transmit. Analog switch 76 is controlled by CPU, RAM and ROM circuit 42. Low power comparator 78 shifts the hearing aid data voltage levels from the range of −1.3 volts to +1.3 volts to the range of 0 to 5 volts when the interface unit 20 is receiving data from the hearing aid 30. The signals at the 0 to 5 volt level are then sent to the CPU, RAM and ROM circuit 42 for proper decoding. When the interface unit 20 is transmitting data to the hearing aid 30, low power comparator 80 shifts the 0 to 5 volts levels of the CPU, RAM and ROM circuit 42 to the −1.3 to +1.3 volt levels of the hearing aid 30. For both directions of data transmission, the CPU, RAM and ROM circuit is responsible for all decoding and bit framing. Circuit 81 powers the hearing aid 30 during programming through the hearing aid's standard battery connections.

Hearing aid sense circuit 50 senses when the hearing aid 30 is connected to hearing aid port 54. The hearing aid sense circuit 50 senses a current demand of 1 milliampere present on the +1.3 volt line of the hearing air port 54. Comparators 82 and 84 form a current to voltage converter and a voltage comparator circuit. When the current demand exceeds 1 milliampere on the 1.3 volt data supply line, the output of comparator 82 changes logic levels. This change in logic level is detected by the CPU, RAM and ROM circuit 42 and is used to control the LED status indicators and operating conditions.

The heart of CPU, RAM and ROM circuit 42 is microcontroller 86, an eight bit microcontroller. Latch 88 is used to latch in the lower eight bits of the address bus. RAM 92 is an 8K by 8 bit static RAM that is used for scratch pad memory during transfer of data between the hearing aid 30 and modem 22. ROM 90 contains the custom software which is provided in Table I.

TABLE I

| Reference No. | Value or Type | Manufacturer |
|---|---|---|
| 56 | MAX232CPE | Maxium Corp. |
| C13 | 10 microfarad | |
| C14 | 0.1 microfarad | |
| C15 | 10 microfarad | |
| C16 | 10 microfarad | |
| C17 | 10 microfarad | |
| C18 | 10 microfarad | |
| U7 | 74C04N | |
| Z1 | SAB15 | Transorb |
| Z2 | SAB15 | Transorb |
| Z3 | SAB15 | Transorb |
| 76 | AD7512DIJN | Analog Devices |
| 78 | LP311N | |
| 80 | LP311N | |
| 81 | LM317LZ | National Semiconductor |
| C19 | 1000 picofarad | |
| Z4 | SAB 5.0 | Transorb |
| R9 | 22K ohms | |
| R10 | 22K ohms | |
| R11 | 1.5K ohms | |
| R12 | 1K ohms | |
| C12 | 0.1 microfarad | |
| D7 | 1N4148 | |
| D8 | 1N4148 | |
| C22 | 0.1 microfarad | |
| R17 | 300K ohms C20 | 10 microfarad |
| R13 | 604 ohms 1% | |
| R14 | 40.2 ohms 1% | |
| C21 | 0.1 microfarad | |
| 84 | TL061CP | |
| 82 | LP311N | National Semiconductor |
| R15 | 22K ohms | |

TABLE I-continued

| Reference No. | Value or Type | Manufacturer |
|---|---|---|
| R16 | 220 ohms | |
| R18 | 22K ohms | |
| R19 | 470 ohms | |
| 86 | 80C31BH | Intel Corp. |
| 88 | 74HC373 | Texas Instruments |
| 90 | TMS27C256-25JL | |
| 92 | MCM6064-10 | |
| U8 | 74HC08N | Motorola |
| XTAL 1 | 7.3728 MHz NDK073 | N-Tron |
| C1 | 10 microfarad | |
| C2 | 0.1 microfarad | |
| C3 | 10 microfarad | |
| C4 | 27 picofarad | |
| C5 | 27 picofarad | |
| C6 | 0.1 microfarad | |
| R1 | 8.2K ohms | |
| C7 | 1 microfarad | |
| C8 | 0.1 microfarad | |
| C9 | 1 microfarad | |
| C10 | 0.1 microfarad | |
| 106 | 74HC374N | |
| 108 | 74HC374N | |
| U8 | 74HC08N | Motorola |
| D1 | LED #550-3005 | |
| D2 | LED #550-3005 | |
| D3 | LED #550-3005 | |
| D4 | LED #550-3005 | |
| D5 | LED #550-3005 | |
| D6 | LED #550-3005 | |
| R2 | 150 ohms | |
| R3 | 150 ohms | |
| R4 | 150 ohms | |
| R5 | 150 ohms | |
| R6 | 150 ohms | |
| R7 | 150 ohms | |
| C11 | 0.1 microfarad | |
| C12 | 0.1 microfarad | |

LED Driver circuit 44 has six bi-directional, red/-green light emitting diodes 94, 96, 98, 100, 102 and 104. Drivers 106 and 108 latch the display pattern to be displayed. Each light emitting diode is capable of being either a green color, a red color or being turned off. These six light emitting diodes display the status of the interface unit 20.

A list of the preferred components to be used in the schematic diagram of FIG. 4 is shown in Table II.

TABLE II

```
MAIN:     CALL   MODEM_HA_LED              ;Poll the HA sense and DSR.
          JNB    GOT_A_CR, MAIN            ;Detected a <CR> yet?
;Io get here, the serial port has just received a <CR>. First reset the
;<CR> flag, then decode and process the command just received.
          CLR    GOT_A_CR
          MOV    DPTR,#CURRENT_CMD
          CALL   DECODE
          JC     MAIN_1                    ;Is message rcved 'CURRENT'?
          CALL   CURRENT                   ;Yes! Go execute it!
          SJMP   MAIN_END
MAIN_1:   MOV    DPTR,#CR_MSG              ;Command is not CURRENT!
          CALL   LOAD_XMT_BUFF             ;Echo the terminating <CR> now.
          MOV    DPL,S_RCV1_LO             ;Load pointer to the serial data.
          MOV    DPH,S_RCV1_HI
          MOVX   A,@DPTR                   ;Fetch the 1st char of message.
          CJNE   A,#CR, MAIN_2             ;Is 1st character a <CR>?
          MOV    DPTR,#ERR208              ;Yes! Send a error message!
          CALL   LOAD_XMT_BUFF
          SJMP   MAIN_END
MAIN_2:   MOV    DPTR,#PGMHA_CMD           ;Not 'CURRENT' cmd!
          CALL   DECODE
          JC     MAIN_3                    ;Is message rcved 'PGMHA'?
          CALL   PGHMA                     ;Yes! Go Execute it!
          SJMP   MAIN_END
MAIN_3:   MOV    DPTR,#UNLOCK_CMD          ;Not 'PGMHA' cmd!
          CALL   DECODE
          JC     MAIN_4                    ;Is message rcved 'UNLOCK'?
          CALL   UNLOCK                    ;Yes! Go execute it!
          SJMP   MAIN_END
```

TABLE II-continued

```
MAIN_4:       MOV    DPTR,#VER_CMD                        ;Not 'MODE' cmd!
              CALL   DECODE
              JC     MAIN_5                               ;Is message rcved 'VERSION'?
              CALL   VERSION                              ;Yes! Go execute it!
              SJMP   MAIN_END
MAIN_5:       MOV    DPTR,#LED_CMD                        ;Not 'VERSION' cmd!
              CALL   DECODE
              JC     MAIN_6                               ;Is message rcved 'LED'?
              CALL   LEDS                                 ;Yes! Go execute it!
              SJMP   MAIN_END
;If we get here, we have failed to recognize the message received. Send a
;error message back.
MAIN_6:       MOV    DPTR,#ERR209
              CALL   LOAD_XMT_BUFF
;We have completed the "decoding" of this particular message. Now advance
;the receiver buffer pointer to just past the <CR> character.
MAIN_END:     MOV    DPL,S_RCV1_LO                        ;Fetch the serial data pointer.
              MOV    DPH,S_RCV1_HI
MAIN_END_Y:   MOVX   A,@DPTR                              ;Fetch received character.
              MOV    R7,A
              INC    DPTR                                 ;Bump pointer and test for OV.
              MOV    A,DPL
              CJNE   A,#LOW(S_RCV_END),MAIN_END_X
              MOV    A,DPH
              CJNE   A,#HIGH(S_RCV_END),MAIN_END_X
              MOV    DPTR,#S_RCV_START
MAIN_END_X:   CJNE   R7,#CR,MAIN_END_Y                    ;Are we pointing at the <CR>?
              MOV    S_RCV1_LO,DPL                        ;Yes! Reset the buffer ptr.
              MOV    S_RCV1_HI,DPH
              JMP    MAIN
```

Figure 5:
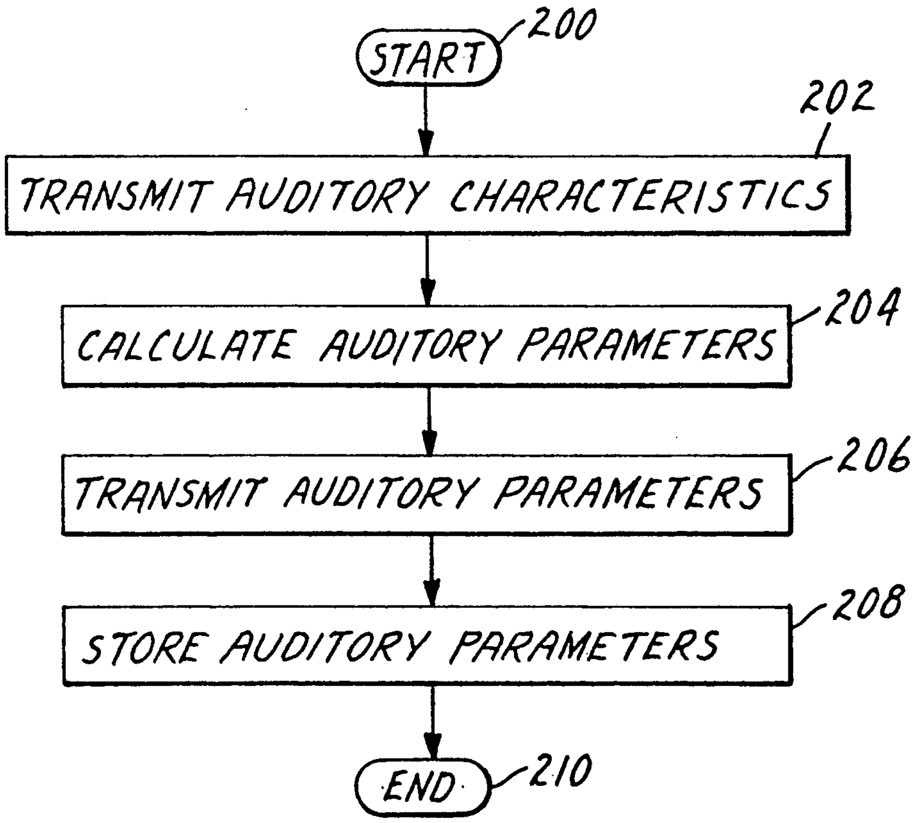
FIG. 5 is a flow chart of an embodiment of the present invention.

The flow chart of the method present invention is illustrated in FIG. 5.

The method starts in block 200. The auditory characteristics of the individual for which the hearing aid 30 is being fitted, and which are determined by obtaining an audiogram, are transmitted 202 from the remote location 12 to a central office 16. An appropriate set of auditory parameters are calculated 204 by a computer 26 in or accessible to the central office 16. The calculated set of auditory parameters are then transmitted 206 back to the remote location 12. This set of auditory parameters is then stored in memory 38 of programmable hearing aid 30 and the process is completed 210.

Thus, it can be seen that there has been shown and described a novel method, apparatus, system and interface unit for programming a hearing aid. It is to be recognized and understood, however, that various changes, modifications and substitutions in the form and the details of the present invention may be made by those skilled in the art without departing from the scope of the invention as defined by the following claims.

What is claimed is:

1. A system for programming a plurality of hearing aids, each of said plurality of hearing aids capable of being responsive to auditory characteristics of an individual user, being responsive to a set of auditory parameters and having a programmable memory for storing said set of auditory parameters, comprising:

a plurality of first transmitting means for transmitting via telephone lines said auditory characteristics of each of said individual users to a central office;

calculating means for calculating at said central office an appropriate set of auditory parameters for each of said plurality of hearing aids based upon said auditory characteristics of said individual user;

second transmitting means for transmitting via telephone lines appropriate set of auditory parameters from said central office to each corresponding one of said plurality of hearing aids; and a plurality of storing means for storing said appropriate set of auditory parameters in said programmable memory of each of said plurality of hearing aids.

2. A system for programming a plurality of hearing aids as in claim 1 wherein said plurality of hearing aids are located at separate locations remote from the location of said central office.

3. A system for programming a plurality of hearing aids as in claim 2 where there are at least one of said first transmitting means and at least one of said storing means for each of said separate locations.

4. A system for programming a plurality of hearing aids as in claim 3 which further comprises a plurality of means for transmitting said set of auditory characteristics for each of said plurality of hearing aids to each of said separate location.

5. A system for programming a plurality of hearing aids physically located at a plurality of remote locations, each of said plurality of hearing aids capable of being responsive to auditory characteristics of an individual user, being responsive to a set of auditory parameters and having a programmable memory for storing said set of auditory parameters, comprising:

first transmitting means, located at each of said plurality of remote locations, for transmitting via telephone lines said auditory characteristics of those of said individual users to a central location;

calculating means, located at said central location, for calculating at said office an appropriate set of auditory parameters for each of said hearing aids based upon said auditory characteristics of each of said individual users;

second transmitting means for transmitting via telephone lines said appropriate set of auditory parameters from said central location to each of said plurality of remote locations for each of said hearing aids; and storing means, located at each of said plurality of remote locations, for storing said appropriate set of auditory parameters in said programmable memory of each of said plurality of hearing aids.

6. A method for programming a plurality of hearing aids physically located at a plurality of remote locations, each of said plurality of hearing aids capable of being responsive to auditory characteristics of an individual user, being responsive to a set of auditory parameters and having a programmable memory for storing said set of auditory parameters, comprising the steps of:

transmitting via telephone lines from each of said plurality of remote locations said auditory characteristics of those of said individual users located at each of said plurality of remote locations to a central location;

calculating at said central location an appropriate set of auditory parameters for each of said hearing aids based upon said auditory characteristics of each of said individual users;

transmitting via telephone lines said appropriate set of auditory parameters from said central location to each of said plurality of remote locations for each of said hearing aids; and storing said appropriate set of auditory parameters in said programmable memory of each of said plurality of hearing aids.

7. A method of programming a plurality of hearing aids as in claim 6 which further comprises the step of transmitting said set of auditory characteristics for each of said plurality of hearing aids, located at each of said remote location, to said central location.

8. A method of programming a plurality of hearing aids as in claim 6 wherein said step of transmitting said auditory characteristics is performed individually by each of said remote locations originating telephone contact.

9. An interface unit utilized with a programmable hearing aid to accommodate auditory characteristics of an individual user and a telephonic link to a remotely located central programming device, said hearing aid being responsive to a set of auditory parameters and having a programmable memory for storing said set of auditory parameters, comprising:

receiving means for receiving an appropriate set of auditory parameters via said telephonic link which have been calculated by said central programming device; and storing means for storing said appropriate set of auditory parameters in said programmable memory of said hearing aid.

10. An interface unit utilized with a programmable hearing aid to accommodate auditory characteristics of an individual user and a telephonic link to a remotely located central programming device, said hearing aid being responsive to a set of auditory parameters and having a programmable memory for storing said set of auditory parameters, comprising:

transmitting means for transmitting said auditory characteristics of said individual user to said central programming device via said telephonic link;

receiving means for receiving an appropriate set of auditory parameters via said telephonic link which have been calculated by said central programming device; and storing means for storing said appropriate set of auditory parameters in said programmable memory of said hearing aid.

* * * * *